United States Patent [19]

Bobeck

[11] 3,714,640

[45] Jan. 30, 1973

[54] SINGLE WALL DOMAIN PROPAGATION ARRANGEMENT

[75] Inventor: Andrew Henry Bobeck, Chatham, N.J.

[73] Assignee: Bell Telephone Laboratories, Incorporated, Murray Hill, N.J.

[22] Filed: May 28, 1971

[21] Appl. No.: 147,853

[52] U.S. Cl. ........................340/174 TF, 340/174 SR

[51] Int. Cl. ..........................G11c 11/14, G11c 19/00

[58] Field of Search ..........................340/174 TF

[56] References Cited

UNITED STATES PATENTS 3,513,452 5/1970 Bobeck et al. ..................340/174 TF
3,503,054 3/1970 Bobeck et al. ..................340/174 TF
3,470,547 9/1969 Bobeck ..........................340/174 TF
3,638,206 1/1972 Thiele ...........................340/174 TF
3,638,207 1/1972 Smith et al. .....................340/174 TF

*Primary Examiner*—Stanley M. Urynowicz, Jr.
*Attorney*—R. J. Guenther and Kenneth B. Hamlin

[57] ABSTRACT

An external means for supplying a bias field of a polarity to contract single wall domains employed to insure the stability of single wall domains in a layer of a host magnetic material has been found to be unnecessary if a surface layer of the host material is prepared so that the surface is permanently magnetized normal to the plane of the host layer and exchange-coupled to the body of that layer.

8 Claims, 4 Drawing Figures

INVENTOR
A. H. BOBECK
BY Herbert M. Shapiro
ATTORNEY

SINGLE WALL DOMAIN PROPAGATION ARRANGEMENT

FIELD OF THE INVENTION

This invention relates to data processing arrangements and more particularly to such arrangements in which information is represented as single wall domains.

BACKGROUND OF THE INVENTION

The term "single wall domain" refers to a magnetic domain which is movable in a layer of a suitable magnetic material and is encompassed by a single domain wall which closes on itself in the plane of that layer.

Propagation arrangements for moving a domain are designed to produce magnetic fields of a geometry determined by the layer in which a domain is moved. Most materials in which single wall domains are moved are characterized by a preferred magnetization direction, for all practical purposes, normal to the plane of the layer. The domain accordingly constitutes a reverse magnetized domain which may be thought of as a dipole oriented transverse, nominally normal to the plane of the layer. Accordingly, the movement of a domain is accomplished by the provision of an attracting magnetic field normal to the layer and at a localized position offset from the position occupied by the domain. A succession of such fields causes successive movements of a domain as is well known.

One propagation arrangement comprises a pattern of electrical conductors each designed to form conductor loops which generate the requisite fields when externally pulsed. The loops are interconnected and pulsed in a three-phase manner to produce shift register operation as disclosed in A. H. Bobeck, U. F. Gianola, R. C. Sherwood, W. Shockley U.S. Pat. No. 3,460,116 issued Aug. 5, 1969.

One mode of operating with single wall domains is referred to as the "bias mode" because a bias field of a polarity to contract domains is generated in the material under normal operating conditions in order to maintain constant the diameters of single wall domains therein. Since a typical host layer for single wall domains has a preferred direction of magnetization normal to the plane of the sheet, the bias field also is essentially normal.

The bias field is usually generated by a coil encompassing the layer in which single wall domains are moved and oriented in the plane of that layer. A suitable drive arrangement provides a current in the coil for generating the field in a controllable manner.

BRIEF DESCRIPTION OF THE INVENTION

It has been found that the bias field can be provided by preparing the surface of the host layer in which domains are moved such that the surface layer is permanently set magnetically along a first preferred direction of magnetization and exchange coupled to the body of that layer. Bias mode operation with domains of essentially constant diameter is thus provided in the absence of an external bias implementation. In one embodiment of this invention an epitaxial layer of garnet is grown on a suitable nonmagnetic garnet substrate and coated with a sputtered surface layer of a rare earth cobalt alloy such as $Co_{3.2}Cu_{1.3}Fe_{.5}Ce_{.25}Sm_{.75}$ permanently set by a magnetic field.

My U.S. Pat. No. 3,529,303 issued Sept. 15, 1970, describes an arrangement in which opposite surfaces of a platelet in which single wall domains can be moved are prepared to provide a similar biasing field.

DETAILED DESCRIPTION

Figure 1:
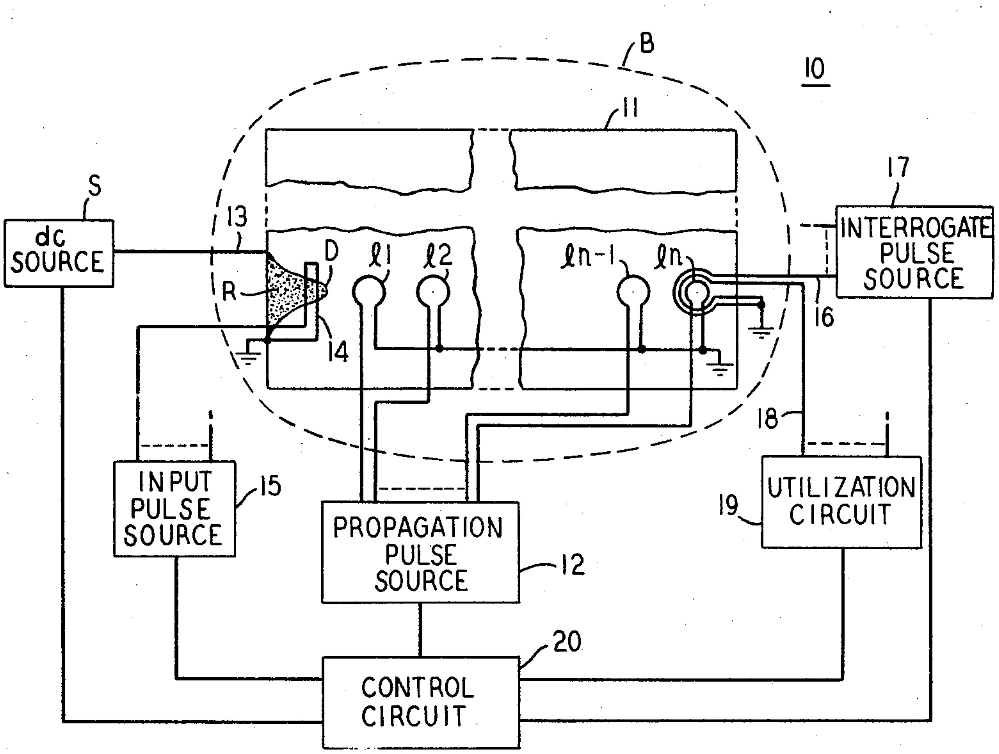
FIG. 1 is a schematic representation of an arrangement in accordance with this invention.

FIG. 1 shows a domain propagation arrangement 10 in accordance with this invention. The arrangement includes a magnetic host layer 11 in which single wall domains are moved. Only a single channel for domain propagation is shown. It is to be understood, however, that the channel is only representative and that others may be defined in a similar manner either parallel to the one shown or at an angle thereto in accordance with the teaching of the above-mentioned patent.

The channel is defined illustratively by a succession of conductor loops, *l1*, *l2*, *l3*–*ln*, which are pulsed to generate consecutive localized magnetic fields (gradients) to attract a single wall domain from an input to an associated output position. The conductor loops are connected between a propagation pulse source 12 and ground to this end.

Single wall domains are introduced into a domain propagation channel from a source of domains illustratively comprising a region of R of magnetization which is in the direction of the magnetization of a single wall domain. Region R is encompassed by a conductor 13 which is connected between a DC source S and ground. A hairpin conductor 14 is associated with source 13 to separate a portion D thereof when pulsed. Condcutor 14 is connected between input pulse source 15 and ground. When source 15 pulses conductor 14, portion D is separated from region R and becomes a single wall domain for propagation. Conductor 13 operates to restore region R to its normal shape when the pulse in conductor 14 terminates. If a pulse is absent in a particular input time slot, no domain is generated of course. Binary ones and zeros thus are represented by the presence and absence of single wall domains respectively.

A domain pattern representative of information is moved along a propagation channel, by the propagation loops pulsed in a familiar three-phase manner, towards an output position.

An output position is defined illustratively by a conductor 16 which loops the rightmost (terminal) propagation loop (*ln*) as viewed in FIG. 1. Conductor 16 is connected between an interrogate pulse source 17 and ground and serves to collapse a domain present in the position so coupled. A conductor 18 also couples such terminal position. Conductor 18 is connected between a utilization circuit 19 and ground. If a domain is present in the coupled terminal position when an interrogate pulse is applied to conductor 16, conductor 18 applies a pulse to utilization circuit 19. The interrogate pulse is usually applied synchronously with an input pulse and a selected propagation pulse and the various circuits and sources are connected to a control circuit 20 for appropriate activation and synchronization.

The various circuits and sources may be any such elements capable of operating in accordance with this invention.

Operation of a domain propagation device in the bias mode utilizes a bias field normal to the plane of layer 11 as has been stated above. Such a field is normally provided by a current in a coil in the plane of layer 11 occupying the position of imaginary circle B. In accordance with this invention, domains can be moved in layer 11 with essentially constant diameters in the absence of such a bias field. The equivalent of the bias field is provided by the structure of layer 11.

A simple way to demonstrate the effectiveness of a structure in accordance with this invention in providing a bias equivalent field is to examine that structure under different magnetic conditions, express the differences in conditions in mathematical terms, and compare the resulting terms with an expression for a generated bias field. With this context in mind, we can examine the structure of layer 11 as shown in an imaginary side view in FIG. 2. Layer 11 may be thought of as including two separate layers which may in fact be a single body as is discussed further hereinafter. The layers are designated 21 and 22 in FIG. 2. Layer 21 has the property that the magnetization therein can be set permanently while that of layer 22 can be changed at specified fields in the contemplated operation.

Figure 2:
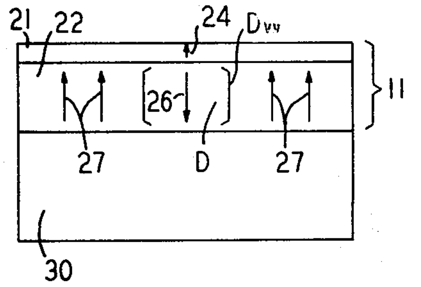
FIGS. 2, 3, and 4 are schematic representations of portions of the arrangement of FIG. 1.

Layer 21 is assumed to have magnetization directed upward as indicated by the upward directed arrow 24 in FIG. 2. Layer 22, on the other hand, is assumed to have its magnetization directed downward, as indicated by downward directed arrow 26 in FIG. 2, in the single wall domain which is designated D as in FIG. 1. The remainder of layer 22 has its magnetization directed upward as indicated by the upward directed arrows 27. It is clear that a domain wall exists between domain D and the remainder of layer 22 as well as between domain D and the surface layer 21. The domain wall is designated DW in FIG. 2.

Figure 3:
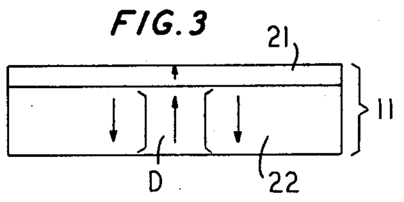

FIG. 3 shows the magnetization in domain D and the remainder of layer 22 reversed from that shown in FIG. 2. It is clear from FIG. 3 that no domain wall exists between domain D and the magnetization of layer 21.

Consider, in this context, the domain wall energy that can exist in the interface of layers 21 and 22. It is clear that in FIG. 2 the total wall energy at this interface is $$\epsilon_\omega = \pi r^2 \sigma_\omega \qquad (1)$$

where $\sigma_\omega$ is the wall energy per unit area and $r$ is the radius of the domain. The force acting to change the domain size is given by $$\delta\epsilon_\omega / \delta r = 2\pi r \sigma_\omega \qquad (2)$$

This can be compared to the force produced by a conventionally applied bias field $H_A$ $$\delta\epsilon_A / \delta r = 4\pi r h M_s H_A \qquad (3)$$

where $h$ is the layer 22 thickness and $M_s$ is the saturation magnetic moment of layer 22. If we normalize each of forces (2) and (3) in terms of an applied bias field $H_A$, we recognize a new effective field which we can designate as $H_w$ $$H_w = \sigma_\omega / 2hM_s \qquad (4)$$

We see now that the wall energy tends to act as a bias field and that field is not dependent on the domain size.

If we let the average value of this field be $H_B$, then a thickness $h_b$ can be selected for a particular host layer by $$h_b = \sigma_\omega / 2M_s H_B \qquad (5)$$

Figure 4:
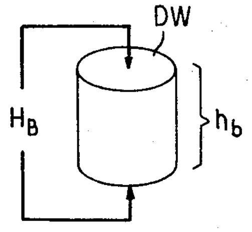

At this thickness, shown in FIG. 4, the cylindrical domains are stable and will remain stable without the necessity of an external applied field.

A convenient structure of the type shown in FIG. 2 is prepared by liquid phase epitaxial deposition techniques in which a layer 11 of, for example, europium erbium gadolinium garnet is formed on a gadolinium gallium garnet substrate 30 shown in the FIG. Layer 11 typically has a thickness of 4 microns in which domains having diameters of 4 microns are maintained by a bias field of 60 oersteds. A layer 21 of a rare earth cobalt alloy, 2 microns thick and having a coercive force of 5,000 oersteds, provides such a bias in the absence of an external bias source. A drive field of 20 oersteds moves domains in layer 22 with only negligible effect on the magnetization of layer 21.

There are alternative structures wherein an additional layer is deposited on the surface of a suitable layer of material in which single wall domains can be moved. For example, a high coercivity layer of, for example, magnetoplumbite or chromium oxide, the latter being illustrative of suitable antiferromagnetic materials, can be deposited on an epitaxial garnet layer to this end. All that is necessary is that the surface layer, whether grown or deposited, be of sufficiently high coercivity to remain set permanently during operation and that the layer be exchange-coupled to the body layer.

What has been described is considered only illustrative of the principles of this invention. Consequently, various modifications in accordance with those principles can be devised by one skilled in the art without departing from the spirit and scope of this invention.

What is claimed is:

1. A domain propagation arrangement comprising a first layer of magnetic material in which single wall domains can be moved, said layer being characterized by a preferred direction of magnetization along an axis out of the plane of said layer and having a surface layer and a body layer, said surface layer being effectively permanently set in a direction along said axis and exchange coupled to said body layer, and means for moving single wall domains in said body layer in a manner to avoid changing the magnetization in said surface layer.

2. An arrangement in accordance with claim 1 wherein said axis is substantially normal to the plane of said first layer.

3. An arrangement in accordance with claim 2 wherein said body layer comprises an epitaxially grown crystal.

4. An arrangement in accordance with claim 2 wherein said body layer comprises a crystal of epitaxial garnet having a strained surface layer for maintaining a preset condition of magnetization therein.

5. An arrangement in accordance with claim 2 wherein said body layer comprises epitaxial garnet and said surface layer comprises a relatively high coercivity layer.

6. An arrangement in accordance with claim 5 wherein said body layer comprises epitaxially grown europium erbium gallium garnet.

7. An arrangement in accordance with claim 5 wherein said surface layer comprises a rare earth cobalt alloy.

8. A domain propagation arrangement comprising a first layer of epitaxially deposited magnetic material in which single wall domains can be moved, said layer being characterized by a preferred direction of magnetization along an axis out of the plane of said layer and having a body layer and a single surface layer, said surface layer being effectively permanently set in a direction along said axis and exchange coupled to said body layer, and means for moving single wall domains in said body layer in a manner to avoid changing the magnetization in said surface layer.

* * * * *